US012775504B2

(12) United States Patent
Karagounis et al.

(10) Patent No.: US 12,775,504 B2
(45) Date of Patent: Oct. 27, 2026

(54) WORKLOAD DISTRIBUTION AND EXECUTION PLATFORM FOR EXECUTING ARTIFICIAL INTELLIGENCE TASKS IN CLIENT COMPUTER SYSTEMS OR COMPUTER SYSTEMS IN CLIENT ROLES BASED ON CLIENT STATUS RESOURCE INFORMATION

(71) Applicant: Xhilon LLC, Sammamish, WA (US)

(72) Inventors: Vasilios Karagounis, Sammamish, WA (US); Connie Chryssan, Sammamish, WA (US)

(73) Assignee: XHILON LLC, Sammamish, WA (US)

( * ) Notice: Subject to any disclaimer, the term of this patent is extended or adjusted under 35 U.S.C. 154(b) by 23 days.

(21) Appl. No.: 19/273,622

(22) Filed: Jul. 18, 2025

(65) Prior Publication Data

US 2026/0119267 A1 Apr. 30, 2026

Related U.S. Application Data

(60) Provisional application No. 63/714,798, filed on Oct. 31, 2024.

(51) Int. Cl.
*G06F 9/50* (2006.01)

(52) U.S. Cl.
CPC ...... *G06F 9/5055* (2013.01); *G06F 2209/501* (2013.01); *G06F 2209/503* (2013.01)

(58) Field of Classification Search
None
See application file for complete search history.

(56) References Cited

U.S. PATENT DOCUMENTS

| | | | |
|---|---|---|---|
| 9,948,514 B2 | 4/2018 | Kansal et al. | |
| 10,248,653 B2 | 4/2019 | Blassin et al. | |
| 11,526,385 B1 | 12/2022 | Mannar | |
| 11,693,837 B2 * | 7/2023 | Davidson | G06F 16/955 707/695 |

(Continued)

OTHER PUBLICATIONS

Danquah et al., "Vehicular Volunteer Computing (VVC): a Novel Paradigm for The Volunteering of Vehicular Resources; Opportunities and Challenges," International Conference on Computing, Electronics & Communications: 208-213, 2019.

(Continued)

*Primary Examiner* — Zujia Xu
(74) *Attorney, Agent, or Firm* — Seed Intellectual Property Law Group LLP

(57) ABSTRACT

A secure computer network is described, within which a routing node interacts with multiple client nodes each assigned for local user use. The client nodes each periodically report operating data for the client node reflecting (a) a level of availability of the client node to perform external requests, (b) a level of availability on the client node of each of multiple software modules, and/or (c) a predicted level of performance of the client node in executing each software module. The routing node receives this operating data, and uses it to update a client status resource for each of the client nodes. When it receives a request identifying a software module and input data, it uses the contents of the client status resource to select a client nodes, to which it causes the request to be delegated to execute the identified software module upon the input data to produce execution results.

30 Claims, 6 Drawing Sheets

(56) References Cited

U.S. PATENT DOCUMENTS

| | | | | |
|---|---|---|---|---|
| 11,816,465 | B2 * | 11/2023 | Koval | G06F 8/71 |
| 12,111,859 | B2 * | 10/2024 | Siebel | G06F 16/345 |
| 2003/0220940 | A1 * | 11/2003 | Futoransky | H04L 63/20 |
| 2009/0080442 | A1 * | 3/2009 | Narayan | H04L 12/40039 370/400 |
| 2010/0058352 | A1 * | 3/2010 | Esfahany | G06F 9/505 718/105 |
| 2011/0270968 | A1 | 11/2011 | Salsburg et al. | |
| 2013/0060933 | A1 * | 3/2013 | Tung | H04L 41/5003 709/224 |
| 2014/0304764 | A1 * | 10/2014 | Banerjee | H04L 63/02 726/1 |
| 2015/0074216 | A1 * | 3/2015 | Park | H04L 41/5025 709/208 |
| 2019/0163541 | A1 * | 5/2019 | Sassatelli | G06F 1/305 |
| 2019/0188386 | A1 | 6/2019 | Pogorelik et al. | |
| 2019/0318240 | A1 | 10/2019 | Kulkarni et al. | |
| 2019/0391880 | A1 * | 12/2019 | Wang | G06F 11/1461 |
| 2020/0019654 | A1 * | 1/2020 | Gou | G06F 30/3323 |
| 2020/0205055 | A1 * | 6/2020 | Snodgrass | H04L 45/745 |
| 2021/0405984 | A1 * | 12/2021 | Agarwal | G06F 11/3409 |
| 2022/0206865 | A1 | 6/2022 | Voruganti et al. | |
| 2022/0300218 | A1 * | 9/2022 | Matsushima | G06Q 30/0207 |
| 2022/0318052 | A1 | 10/2022 | Sivathanu et al. | |
| 2022/0413941 | A1 | 12/2022 | Ramtekkar et al. | |
| 2023/0012487 | A1 * | 1/2023 | Makaya | G06F 9/5027 |
| 2023/0074802 | A1 | 3/2023 | Comer et al. | |
| 2023/0259406 | A1 | 8/2023 | Guan et al. | |
| 2023/0325253 | A1 * | 10/2023 | Hasti | G06F 9/5077 |
| 2024/0004723 | A1 | 1/2024 | Jiang et al. | |
| 2024/0012687 | A1 | 1/2024 | Ganesan et al. | |
| 2024/0177028 | A1 * | 5/2024 | Ezrielev | G06F 9/5088 |
| 2024/0203591 | A1 * | 6/2024 | Dominick | G16H 50/20 |
| 2025/0085955 | A1 * | 3/2025 | Miroshkin | G06F 8/65 |
| 2025/0124278 | A1 * | 4/2025 | Robles Robles | G06N 3/08 |

OTHER PUBLICATIONS

Arora et al., "Scalable Software Infrastructure for Integrating Supercomuting with Volunteer Computing and Cloud Computing," Software Challenges to Exascale Computing (Conference paper): 105-119, 2019.

Manna et al., "Turning Data into Insight with Machine Learning for IBM z/OS," IBM Redbooks, Aug. 2024 (150 pages).

Paluru et al., "How Freshworks developed CloudVerse, an enterprise-grade GenAI platform on AWS," retrieved from https://aws.amazon.com/blogs/apn/how-freshworks-developed-cloudverse-an-enterprise-grade-genai-platform-on-aws/ Oct. 14, 2024 (7 pages).

Ryabinin et al., "Petals: decentralized inference and finetuning of large language models," retrieved from https://research.yandex.com/blog/petals-decentralized-inference-and-finetuning-of-large-language-models Jul. 10, 2023 (5 pages).

* cited by examiner client information DB table 300

| Id | VideoAdapter | vRAM | Conn'd | Conn'd Time | OnAC Power | Battery Percent | Idle Secs | System CalcCapab | Graphics CalcCapab | Connection Hub | ModelsInVRam | ModelsOnDisk | |
|---|---|---|---|---|---|---|---|---|---|---|---|---|---|
| 54 | Qc Adreno 680 | 1MB | 0 | 00:02.6 | 1 | 100 | 5 | 29753 | 43264 | 92.18.50.3 | - | llama3.2: latest/2B | 301 |
| 572 | Intel Iris Xe Graphics | 128MB | 1 | 30:35.0 | 0 | 98 | 9013 | 186509 | 35437 | 10.0.0.148 | granite3-moe: 1b/1.3B | granite3-moe: 1b/1.3B | 302 |
| 1115 | NV GeForce RTX3090 | 24GB | 1 | 10:17.0 | 1 | 100 | 9 | 608303 | 193245 | 92.18.50.3 | Mistral-Small-3.1/23.6B | Mistral-Small-3.1/23.6B | 303 |
| 109 | Intel HD Graphics 620 | 128MB | 1 | 30:33.6 | 0 | 73 | 2 | 52327 | 31248 | 10.0.0.148 | granite3-moe: 1b/1.3B | granite3-moe: 1b/1.3B | 304 |
| 49 | Qc Adreno X1-85 | 0 | 0 | 31:27.6 | 0 | 100 | 222 | 647134 | 45672 | 92.18.50.3 | - | gemma:2b/1.7B | 305 |
| 311 | 312 | 313 | 314 | 315 | 316 | 317 | 318 | 319 | 320 | 321 | 322 | 323 | |

*FIG. 3*

WORKLOAD DISTRIBUTION AND EXECUTION PLATFORM FOR EXECUTING ARTIFICIAL INTELLIGENCE TASKS IN CLIENT COMPUTER SYSTEMS OR COMPUTER SYSTEMS IN CLIENT ROLES BASED ON CLIENT STATUS RESOURCE INFORMATION

CROSS-REFERENCE TO RELATED APPLICATION(S)

This Application claims the benefit of U.S. provisional patent application 63/714,798, filed Oct. 31, 2024, and entitled "System and Method for Workload Distribution and Execution Platform for AI and general processing (DEAI)," which is hereby incorporated by reference in its entirety.

In cases where the present application conflicts with a document incorporated by reference, the present application controls.

BACKGROUND

Artificial intelligence tasks such as inference tasks can impose significant workloads on computing hardware. A common approach to performing these and other large capacity tasks involves sending them to a cloud computing service in which software such as a machine learning model suited to the tasks is installed.

BRIEF DESCRIPTION OF THE DRAWINGS

FIG. 3 is a table diagram showing sample contents of a client information DB table used by the facility in some embodiments as a basis for routing each request to a particular client.

DETAILED DESCRIPTION

Figure 1:
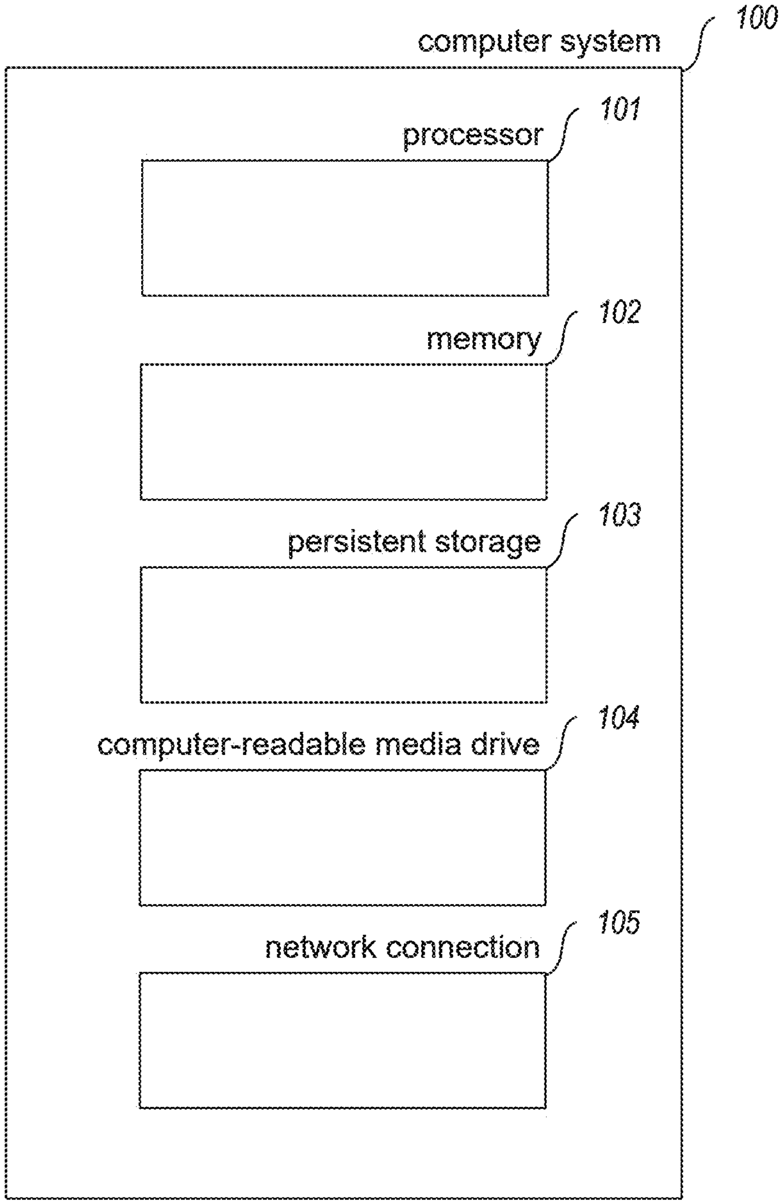
FIG. 1 is a block diagram showing some of the components typically incorporated in at least some of the computer systems and other devices on which the facility operates.

The inventors have recognized significant disadvantages of having computing workloads such as artificial intelligence tasks executed by cloud services. One such disadvantage is data security: the person or organization on whose behalf the task is being performed may regard the task's inputs, outputs, or both as sensitive information. It is common for performance of the task a cloud computing service to incur multiple data security vulnerabilities for both the tasks inputs and its outputs. In particular, inputs and outputs must typically be transmitted to and from the cloud service via a public network, where they risk interception, and, even when encrypted, eventual decryption. Also, the inputs and outputs are at least temporarily present on the servers on which the cloud service executes, from where they could be copied before deletion. Finally, a machine learning model that performs the task may retain parts of the inputs and outputs, such as for quality control, model training or retraining, or as the result of leaky design characteristics. In addition to raising native concerns by the person or organization about data security, these vulnerabilities can introduce issues with complying with security rules and regulations that apply to the person or organization, such as security requirements for protected health information imposed by the Health Insurance Portability and Accountability Act.

An additional disadvantage is latency: the task's results are inherently subject to delays imposed by transmitting the inputs to the cloud service, and transmitting the outputs from the cloud service. Additional delays may be imposed by routing and queuing the task within the cloud service and making the necessary model ready for processing, or the selection of underpowered hardware resources that extend the active processing time for the task.

Another disadvantage is cost: the direct cost of using the cloud platform may be high, particularly during high-load periods. Indirect costs such as the cost of network capacity to transmit the inputs and outputs may also contribute to the total cost of performing the tasks.

In response, the inventor has conceived and reduced to practice a software and/or hardware facility providing a workload distribution and execution platform for tasks such as artificial intelligence tasks ("the facility"). In some embodiments, the facility enables organizations to leverage their corporate assets—such as employee PCs and corporate servers—for transaction processing and AI tasks while ensuring data privacy, security, and cost savings. The facility is sensitive to the fact that these resources are primarily being used by an interactive user, and takes special precautions to ensure the user does not notice this additional work in the background. In some embodiments, the facility also considers how to minimize power use in routing decisions to accomplishing requested work. By favoring idle PC resources for workload distribution, the facility can perform a wide range of applications including AI inferencing and other AI based tasks, Monte Carlo simulations, audio transcription, source code compilation, serving dynamic webpages, and other general processing necessary in a company or other organization.

In some embodiments, the facility provides software units such as the following, sometimes as part of a "service" operated for the facility and discussed below: (a) a request distribution unit that identifies and allocates company-owned available hardware resources suitable for specific tasks, integrating with corporate identity and access management systems to ensure data privacy, makes dynamic task allocation decisions based on factors like device capabilities, power consumption, and historical performance data for specific modules or workloads; (b) a task execution monitoring unit that continuously adjusts resource allocation in real-time to prevent device overload and maintain interactive user experience; and (c) overflow management unit that dynamically incorporates additional organizational resources during peak demand periods.

In some embodiments, the facility receives a new request to execute a workload via an interface exposed by a task execution service, such as from an application or web interface. The request identifies a module to be executed to perform the task, such as a particular one of a group of modules, some of which utilize a machine learning model others can implement any type of processing logic the can run on the underlying operating system. The Service executes on a node of the network, and implements the request distribution, execution monitoring, and overflow management units. In the request distribution unit, the facility selects from among the clients available on the network a client to perform the request based on a variety of factors relating to both the request and the clients. These factors can include the speed or efficiency with which the client is projected to be able to perform the request; the level of competition for the client's resources, such as by a local user of the client; etc. In some embodiments, these factors relate to the level of size and complexity of LLMs or other machine learning models implicated by the request; the storage size, processing capacity, or other capabilities of a GPU installed on the client; etc. In some embodiments, the facility uses hints to refine its process for selecting clients and delegating requests, such as hints provided with some or all requests, or units relating to.

In some embodiments, in assigning a request, the facility expands the set of clients available, such as awakening a sleeping client, suspending a lower-priority task underway on an operating client, or accessing a group of overflow devices. In some embodiments, where the facility determines that no available client is adequate to process a particular request, the facility delegates it to an external computing resource, such as a cloud service. In some embodiments, the ability of the facility to perform such external delegations is configurable, on various granularities such as overall, for particular categories of requests or modules, or based on hints or other directions in individual requests. In some embodiments, the facility employs higher levels of security provisions in the external delegation of such requests, such as imposing a layer of encryption for which the cloud service or other external computing resource lacks a basis for decrypting outside of facility code executing within the external computing resource.

In some embodiments, the facility delegates the request to the selected client via one of one more Connection Hubs. In some embodiments, the selected client executes code called a module to perform the request; for example, for a request that involves prompting a large language model ("LLM"), the facility causes a module providing that LLM to be executed on the client. In some embodiments, the facility caches the code and data for modules on clients to hasten their invocation. For example, in some cases, where a client receives a request for which a module not installed on the client is needed, the client obtains a copy of the module from the service via the Connection Hub and installs it on the client, after which it is available to service future requests. In some embodiments, the facility preemptively installs certain modules on certain clients based on predicting that requests that rely on these modules are imminent. In some embodiments, the facility is extensible to handle new kinds of request types, such as those that rely on new modules.

In some embodiments, the facility decomposes large requests into constituent "chunks" that can each be dispatched to a different client. In some cases, these clients are referred to as "minions." When this occurs, the facility composes the constituent responses produced by these clients into a single response to return.

In some embodiments, the facility at least partially relies on access privileges of a user of the client in installing or executing code on the client, accessing network storage and other network resources, etc. In some embodiments, the facility the facility uses specialized access privileges for some or all of these purposes.

By performing in some or all of the ways described above, the facility enables sensitive computing workload requests to be processed at a high level of data security, low level of latency, and low marginal cost. The facility also enables an organization to make fuller, more productive use of its computational resources, while at the same time maintaining positive user experiences on the part of users of the clients to which requests can be delegated.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, the facility derives higher levels of utilization from client computer systems acquired for other purposes, in some cases reducing a number of dedicated server computer systems and/or a level of cloud service capacity needed to service computing workload requests.

Further, for at least some of the domains and scenarios discussed herein, the processes described herein as being performed automatically by a computing system cannot practically be performed in the human mind, for reasons that include that the starting data, intermediate state(s), and ending data are too voluminous and/or poorly organized for human access and processing, and/or are a form not perceivable and/or expressible by the human mind; the involved data manipulation operations and/or subprocesses are too complex, and/or too different from typical human mental operations; required response times are too short to be satisfied by human performance; etc. For example, the facility's application of large language models, other machine learning models, and compilers cannot be practically performed in the mind of a person, in view of the significant processing and organizational resources needed to execute and apply these software tools.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. None of the components shown in FIG. 1 and discussed above constitutes a data signal per se. While computer systems configured as described above are typically used to support the operation of the facility, those skilled in the art will appreciate that the facility may be implemented using devices of various types and configurations and having various components.

Figure 2:
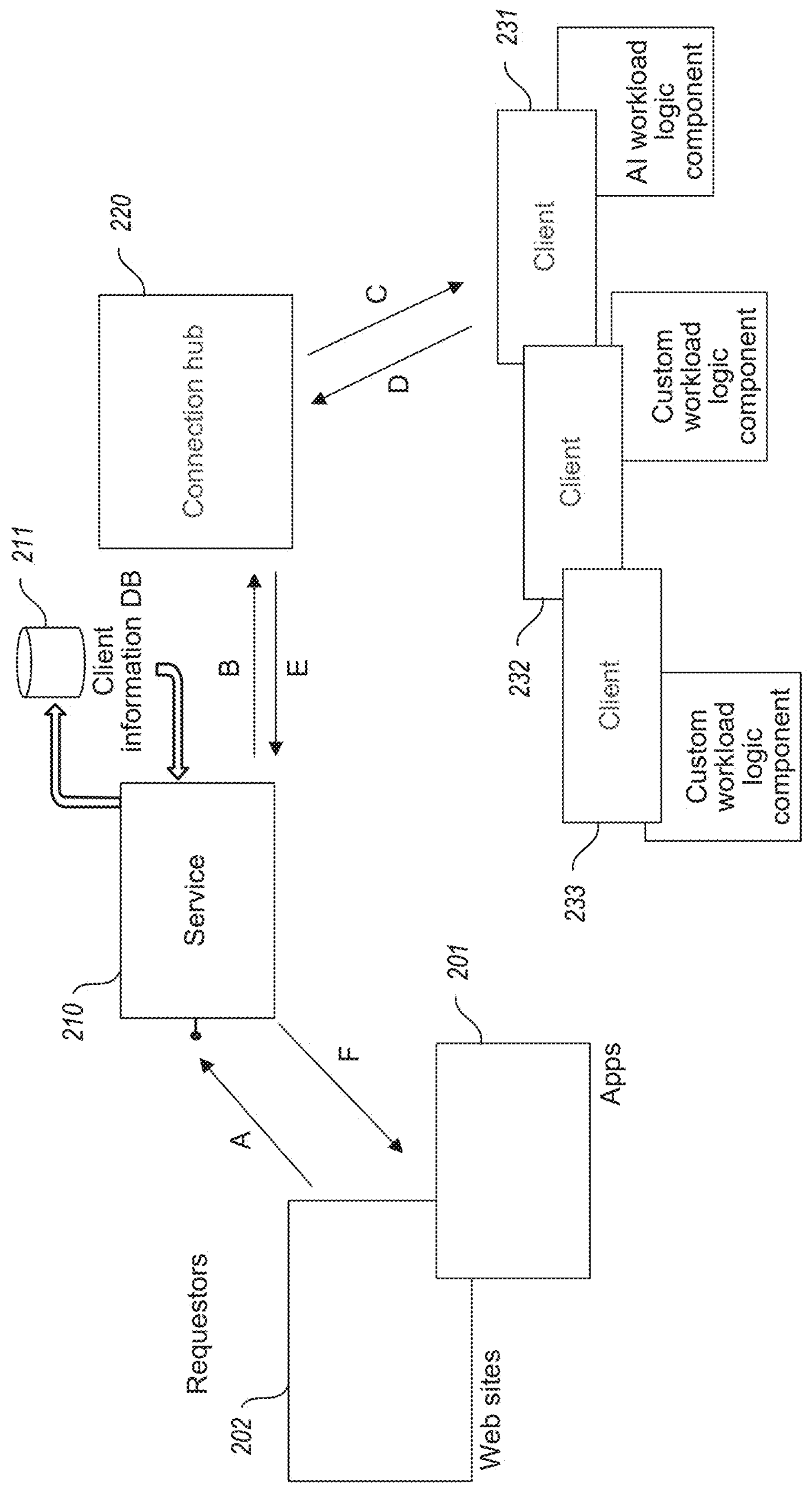
FIG. 2 is a data flow diagram showing the flow of requests and responses.

FIG. 2 is a data flow diagram showing the flow of requests and responses. What is described that here is a base implementation performed by the facility in some embodiments that can gain complexity depending on the situation.

Service 210 is a main service interface and processor used by the facility. In some embodiments, external interfaces are JSON based. In some embodiments, a primary interface to do work receives ModuleName, Version, execution hints to the facility which enable better description of the module behavior and therefore more accurate routing, security tokens, processing context for the module, command line parameters, file attachments, a Unique ID to identify the request, the name of a specific device if the client wants to target a specific client and key sequences in the response stream to signify that larger buffers for the response are required.

In some embodiments, the Service houses several systems including the request distribution unit, the task monitoring unit and resource monitoring functionality. In some embodiments, Service is also the only component of the facility that interacts with the datastore, client information DB 211. Client information DB serializes such information as the modules that are registered into the facility, where their binaries are found, a record of all the Clients and their current hardware and state (Client 231-233—the component that runs on all the PCs and other capable devices on the network). A reference of which modules are installed on which machines (including custom context for each module that can by the component to influence routing decisions). A record and the status of asynchronous requests in this system-meaning long running requests that the system accepts and spins off a process to execute and when completed, report back to the requestor (async requests could take minutes or hours to complete). And finally temporary data stores used by Service to keep context of things such as which machines were offered in a temporary machine block to service a particular kind of request.

In some embodiments, Services are stateless (except for, in some cases, caching for performance resources), and that there can be N Service instances to a single client information DB in a scale\-up scenario. Client information DB can also be deployed in a failover clustered mode or could be hosted in globally distributed datastores such as CosmosDB.

The flow denoted A in FIG. 2 represents an originating request from a web site, application, or other JSON client using the system. This client can also be an externally facing web site that is using the facility to process transactions from internet customers.

In processing the request, the Service performs an authentication check using the domain credentials being presented by the requestor, such as an authentication check that uses AAD, Okta, certificates, etc. Then the Service checks if the overall service is overloaded or whether the request can be accepted. Next the module being requested is verified as valid for the system utilizing client information DB; assuming that is the case, the Service inspects the request to see if it is to be processed on a specific client. If this is the case, the routing engine does not engage to find an appropriate client. It does, however, decide on whether the client will require the binaries for processing.

If the request doesn't specify a specific client, the request distribution module engages to find an appropriate client. The request distribution module builds a set of candidate machines available for service (the next set of connected available devices it hasn't called on yet that suit the parameters of the request) and pulls them into the service cache in Service. It then goes through a prioritization of the devices based on special hardware required or preferred, overall capabilities of the device (system capability metric & GPU capability Metric), whether the module is already installed, processing time/history of the module on the client, whether the client is operating on AC or DC power and, if so, cost of the power in the devices current locale and other hints the client has requested. One of the hints is a "broad distribution" flag which guides the distribution module to send the next request for a specific module to a different client than before (after going through its machine prioritization process). In some embodiments, client information DB access in this process is minimized as the request routing process tries to cache data as much as possible.

Eventually a client is found that best meets the criteria. If none can be found, the request is either returned with a resource not found error, or, if overflow is engaged, the overflow pool of clients. In some embodiments, the algorithm also has a provision to incur a slight pause and look again a few times in the case where other work completes freeing up clients.

The request distribution module also uses module identity, previous requests heuristics, and response times to the device to determine whether a device with existing work going on can get another queued for it. An example is that module c1's previous executions on device 34 responded in 400 ms or less. Device 34 is currently executing another module (c4) where mean time execution has been 128 ms with low standard deviation, the request distribution module decides to queue the new c1 work to device 34 as well.

Flow B represents a message that is composed and targeted to the instance of Connection Hub that the selected client is connected to. In some embodiments, this "internal request" is formatted as JSON and includes some additional system internal metadata (such as timing information, unique identifiers for tracing, causality information in addition to a flag that signifies a download of modules is required).

The Connection Hub 220 is the component of the facility that holds bi-directional networking connections to the Client components of the Connection Hub service 220 system. This allows requests to be sent to Client instances, responses to flow back and control information to flow over this channel. The bidirectional nature of the channel is useful as both parties have reasons to instigate communications. In some embodiments, the connection between Connection Hub and Client is based on the WebSocket protocol standard described by The WebSocket Protocol, available at datatracker.ietf.org/doc/html/rfc6455. This allows a structured communications protocol that can traverse corporate firewalls, allow inspection and all the other features available to http/https-based protocols. In some embodiments, Connection Hub is stateless and there can be multiple instances of Connection Hub to every instance of Service in a scale-up scenario.

Connection Hub inspects the incoming message to determine whether it contains a reference to a module that the Connection Hub doesn't yet have cached. If this is the case, Connection Hub calls into Service (via JSON interface), requesting the specific binary/version. On receipt, the Connection Hub adds the module to its cache. Additionally, where the module is not already stored on the selected client, the Connection Hub packages the new binary into the message it is preparing for the Client component.

Flow C represents the message being sent to the selected Client to ask it to do work. In some embodiments, this message is structured as a JSON request, sent over a WebSocket connection.

Clients 231-233 is the component that resides on the end client/PC that is sent work and uses the local resources of the machine to execute the work, compose a response and deliver that response. Clients are also responsible for reporting to the Service the custom modules installed on the machine and installing new ones on demand, static hardware configuration of a device, as well as dynamic environmental factors such as but not limited to the average CPU usage over the last x minutes, GPU dedicated memory interactive user present etc. Clients also periodically compute the "system capability metric" & GPU Capability metric which is a way to blend the capabilities of the machine facilitating a simple way to compare one machine against another. This metric benchmarks the system in an environment that is dynamically changing, so Client recomputes the system capability metric periodically to further improve knowledge of the overall environment and therefore the distribution of work. Client is also responsible for launching the custom and built-in modules to do work. These are mostly packaged in the form of executables to provide isolation between Client, and the custom code being executed. These components are signed by the "Service" or, depending on the type of object, have a signature file accompanying them to verify their integrity before being launched. The commands to launch can contain a set of parameters and/or file attachments that Client facilitates for the process being launched. When Client launches the custom or built-in component it continually reads its output during execution and monitors system resources being utilized by the component. The process output can asynchronously be streamed back to the originating client in small chunks as it is being generated or the system can wait for the module to complete and send back the whole response in one chunk. Client can also be instructed to launch requests that will take minutes or hours and can kick them off while reporting that they are running to Service and returning a positive acknowledgement to the originating client (Async requests).

For Async requests, Service has a special case behavior given the request could take minutes or hours to complete. Service adds a parameter to the called module which points to a local executable it can call when completed. It also provides a one-time unique identifier to identify the work in addition to the facility to capture a response code for the work. The default behavior for the local executable is to signal the completion via sending an email or other (in future) notification which could be sending a queued message, calling a http service or other. The local executable also calls into the Service to update the data store record of the async request.

Once the response (or response chunks) is generated by the custom workload logic component (or AI workload logic component), Client packages these response chunks with the context being generated by the component (if any) and internal timing information and system related context data.

Flow D represents the response chunk mentioned above being packaged and being sent back from Client to Connection Hub, such as in a JSON envelope over the WebSocket protocol. Connection Hub adds some timing and additional context information to aid debugging/tracing, then repackages the response and sends back to Service (E). Service takes the response and checks to see if there is status information about the client in there like a socket disconnection or other error. If an error is found, Service might update the status of the Client in the data store. The response chunk is then sent through to the originating application in Flow F, such as in the form of a Json response. All the way back through the system, each response chunk contains a ChunkNum and EndOfResponse identifier, allowing the intermediate services to act and the originating client to be aware of when it has received all the information. One of these actions is that when the Service sees an EndOfResponse flag on an Async response, it inserts that record into the client information DB to track the request.

When considering the architecture of the system described in FIG. 2, several deployment models are possible given the choices of protocol and technologies in the systems' design. These include: On-Premises, Hybrid, and Internet-based, all described below.

On-Premises: It is anticipated that organizations with the highest privacy concerns would deploy all infrastructure in an on-premises model. Service, client information DB Connection Hub instances are all hosted on server class hardware that is residing in the organization's own datacenters (or datacenters leased by the entities) and under the administrative control of the entities full time employees. Given the nature of the system and processes described herein, the Client software (Client) are deployed on the organization's own PCs (or other network hardware). In some embodiments, this also applies to the overflow clients, which may be housed on server class hardware.

Hybrid deployment: In this model, the facility is split with the service layer instances (Service, Connection Hub) running in the datacenters of a Cloud Service provider, and the Clients (Client) running on the organization's endpoint devices. In a variation of this model, the instances of the Service and client information DB are run on-premises, and instances of Connection Hub are run in cloud service provider facilities. This allows the serialized data in client information DB to continue being managed and under the control of the organization's staff, while the stateless Connection Hub components are deployed in internet data centers more geographically located. The provides some locality advantages while still maintaining privacy.

Internet-based: An additional model is suitable to research, university and non-profit applications: all the component of the system are running in Cloud service provider facilities. In this case, the clients can be running on PCs all over the internet. These PC may not be owned by any organization, and the owners could be reimbursed for the work their PCs are doing on behalf of the system, or the owners can dedicate their PC resources for free.

In some embodiments, the request can specify important contextual and routing guidance to the facility, called "hints." In some embodiments, each unit is a boolean flag; they can include:

"LongRunning." A request can take a long time to complete, up to 10s of seconds. OK to block and wait for a response but could be an important consideration in terms of end user interactive experience if the request history has shown significant resource use through past invocations. Might be better to send to more capable hardware, or a machine that is on AC power that doesn't currently have an interactive user "CPUBound." Request will tend to consume a significant amount of CPU when running "MemoryBound." Request will tend to use a lot of memory resources, choose machine with highest amount of available memory "FastDisk." Module tends to be IO intensive, choose machine with fast disk and/or SSD "GPUDependant." Module requires a GPU to process correctly. Do not route to machines that do not have a dedicated GPU "GPUPreferred." Module does much better in terms of response time and minimal resource use on chosen client machines. Prefer dedicated GPUs (or AI processors) over standard CPU/integrated graphics machines. If not available, it is still OK to route to the non-GPU machine.

"BroadDistribution." Ensure that the next request is sent to a machine that hasn't had a request for this module before (assuming the machine set caters for the minimal requirements for the module). When reach the end of the viable machines, start again from the beginning.

"DontDeployNew." The module being requested does not have the ability to install its dependencies or the installation of dependencies and data will take an excessive amount of time. Assumption is that the administrators for the network will make decisions to deploy the module on specific endpoints with all dependencies and data. When Client next initializes, it will report the nodes with the module and the routing function needs to choose within the set that are available.

"Async." The module is designed to run for a very long time (minutes or hours), so choose a machine that has a history of long runtimes, is connected to AC or has high battery life and that has appropriate sleep timeout parameters set. The system will accept the request, respond with a signal that it is running, and the result will be informed in a module specific way (email, program notification or other). An example here is the transcription of an audio meeting.

"ModelDowngradeOK." A less powerful version of the model or other module being requested can be substituted.

"ModelUpgradeOK." A more powerful version of the model or other module being requested can be substituted.

"RequestChunk." Initiates a single minion with specified parameters to work on a chunk of a decomposed request. It can be called as many times as necessary "LastChunk." Indicates the final piece of work ("chunk") of a decomposed request, and tells the system it can start piecing together the work response.

In some embodiments, the factors used by the facility to select a client to which to delegate a request include one or more measures of the capabilities of the client. For example, in various embodiments, the facility employs one or both of the following two client computer capability metrics: a SystemCalcCapability metric to measure the computational performance of the computer system's procedural processor—i.e., CPU—and a GraphicsCalcCapability metric measuring the performance of the computer system's graphics processing unit—i.e., GPU.

SystemCalcCapability measures and benchmarks the computational performance of a computer processor under realistic conditions. In some embodiments, it achieves this by causing the client computer system to use its CPU to perform a mathematically intensive task—such as identifying prime numbers—and measuring the rate at which this task is completed. The SCC Module is specifically designed to operate within defined resource constraints, limiting its utilization of the computer's processing power and performing its calculations while an end user is potentially present, representing a proxy of what the machine is capable of at the current point in time.

In some embodiments, the SCC Module operates as follows:

1. Initiation & Parameter Input: Upon execution, the SCC Module accepts a single input parameter—a numerical value representing the maximum permissible percentage of the computer's central processing unit (CPU) resources that the SCC Module is authorized to utilize. This parameter serves as a critical constraint on the SCC Module's operation. In some embodiments, its default value is 30%.
2. System Resource Assessment: The SCC Module assesses the computer's hardware configuration, specifically determining the number of logical processor cores available. This information is used to optimize the SCC Module's performance by distributing the computational workload across all available cores.
3. Resource Limitation Implementation: The SCC Module employs a mechanism known as a "Job Object"—a feature of the Windows operating system—to enforce the CPU usage limitation specified by the input parameter. This Job Object acts as a container for the SCC Module's processes, and it is configured to restrict the total amount of CPU time that the SCC Module can consume. This is a key feature for ensuring the SCC Module operates within defined boundaries and does not interfere with other processes running on the computer.
4. Parallel Processing & Prime Number Calculation: The SCC Module divides the task of identifying prime numbers among multiple threads—independent sequences of instructions—each running on a separate processor core. Each thread performs the following steps:
   - Lowers it processor priority to below normal.
   - Iterates through a series of numbers.
   - Determines whether each number is prime by attempting to divide it by smaller numbers.
   - Records the number of prime numbers identified.
5. Result Aggregation & Performance Measurement: Once all threads have completed their calculations, the SCC Module aggregates the results from each thread to determine the total number of prime numbers identified. It then calculates the rate at which prime numbers were identified per unit of time. This rate serves as a metric for evaluating the computer's processing performance.
6. Termination & Resource Release: Upon completion of the calculations, the SCC Module releases all system resources that it was utilizing, ensuring that it does not leave any lingering processes or memory allocations.

Resource Control: The SCC Module's ability to limit its CPU usage is useful. This functionality is relevant in contexts involving claims of interference with other software or systems.

Lower priority: This allows impact from underlying work and the work the user is doing; this ensures that the baseline measurement will not impact the interactive user and the PrivateAI system will be aware of the impact of the interactive user on this system, potentially making the decision to not route work to it.

Performance Measurement: The SCC Module's output—the rate at which prime numbers are identified—is a quantitative measure of processing performance at that current time.

Parallel Processing: The SCC Module's use of multiple threads to perform calculations in parallel is a standard software engineering technique. However, it is important to note that the SCC Module's performance is dependent on the underlying hardware and operating system which provides for an apples-to-apples comparison of one PC to another.

In some embodiments, a GCC module generates a GraphicsCalcCapability metric used by the facility to compare the GPU/AI capabilities of one PC or server against another.

The GCC module is designed to evaluate the performance of a computer's GPU (Graphics Processing Unit). It systematically measures how quickly the GPU can perform fundamental operations—matrix multiplication and 2D convolution—and provides a quantifiable metric to assess its computational power for specific use cases like AI inference and training. The GCC module is structured to be robust, handling potential dependency issues and providing detailed, saved results for later analysis.

Initial Dependency Management: The GCC module begins by ensuring all necessary packages are installed. It defines a list of required packages and iterates through this list, attempting to import/install each package. If an import fails (raising an 'ImportError'), the GCC module automatically tries to install the missing package using the system package installer. This automated dependency management makes the GCC module more user-friendly and avoids wasting space on machines that do not have a reasonable GPU, as it handles the setup process for those who might not have the required packages installed. If a package fails to install automatically, the GCC module gracefully exits with an error message.

GPU Performance Benchmarking: A 'gpu_benchmark' first checks popular parallel graphic libraries to access the hardware's capabilities. The GCC module prints information about the device being used, the software version being used. This provides transparency about the testing environment.

The GCC module then defines the parameters for the benchmark. It sets the dimensions of the matrices for matrix multiplication (M, N, K) and the parameters for the 2D convolution (batch size, number of input/output channels, kernel size). These parameters are chosen to represent typical operations found in deep learning models. The GCC module creates random tensors (multi-dimensional arrays) on the selected GPU device with these defined dimensions. These tensors will be used as input for benchmark computations.

To assess the speed of data transfer between the CPU and GPU, the GCC module also includes a CPU-to-GPU copy speed test. A large random tensor created on the CPU and then copied to the GPU. The time taken for this copy operation is measured.

The GCC module enters a 'while' loop that runs for a specified duration (defaulting to 20 seconds). Inside the loop, it performs two key operations: matrix multiplication ('torch.matmul') and 2D convolution ('torch.nn.functional.conv2d'). The GCC module increments counters ('count_matmul', 'count_conv') for each operation performed. This allows it to track the total number of operations completed during the benchmark. Error handling is included within the loop to catch potential runtime errors during computation.

The GCC module enters a 'while' loop that runs for a specified duration (defaulting to 20 seconds). Inside the loop, after a set number of matrix multiplication and convolution operations (or at regular intervals), the CPU-to-GPU copy operation is repeated. This ensures that the copy speed is measured multiple times during the benchmark, providing a more representative average.

After the loop is completed, the GCC module calculates a performance metric. Instead of calculating the metric solely based on matrix multiplications and convolutions, it also incorporates the CPU-to-GPU copy speed. The rationale is that in many deep learning workloads, the speed of data transfer between the CPU and GPU can be a significant bottleneck. Therefore, the overall metric reflects this.

In some embodiments, the calculation is:

1. Calculate the base performance metric: 'base_metric=(count_matmul+count_conv)*1000/total_execution_time'.
2. Calculate the average CPU-to-GPU copy speed: 'copy_speed=total_bytes_copied/total_copy_time'.
3. Combine the metrics: 'overall_metric=base_metric+(copy_speed*weight_factor)'.

The 'weight_factor' is a tunable parameter that determines the relative importance of the CPU-to-GPU copy speed in the overall metric. A higher 'weight_factor' will give more weight to the copy speed, while a lower 'weight_factor' will prioritize the computational performance of the GPU. The optimal value for 'weight_factor' may vary depending on the specific workload and hardware configuration and will be adjusted through experimentation. In some embodiments, 20% is the default value.

The GCC module then outputs the results, including the device used, software and hardware versions, the calculated metric, execution time, and the counts of each operation. The calculated metric is sent back to the Service for population into the client information table for the client computer system.

Result Saving and Organization: In some embodiments, the GCC module saves the results for future analysis. It creates a dictionary called 'benchmark_results' containing all the relevant information about the benchmark. This dictionary is then converted into a JSON (JavaScript Object Notation) string using 'json.dumps' with an indent of 2 for readability. The JSON string is printed on the console.

To further enhance organization, the GCC module creates a directory named 'benchmark_results' (if it doesn't already exist). It then saves the 'benchmark_results' dictionary as a JSON file within this directory. The filename includes a timestamp to ensure uniqueness. A message is printed to the console indicating the location of the saved file.

Importance and Use Cases: The GCC module serves some or all of the following purposes:

- Performance Evaluation: It provides a quantifiable metric for assessing the performance of a GPU, allowing for comparisons between different GPUs or configurations in the PrivateAI system.
- System Monitoring: It can be used to monitor the performance of a GPU over time, detecting potential degradation or issues.
- Deep Learning Development: It helps developers choose the appropriate hardware for their deep learning projects.
- Benchmarking and Optimization: It can be used to benchmark different deep learning models and optimize their performance.
- Reproducibility: The GCC module saves the results to a file, ensuring reproducibility of the benchmark.
- Holistic Performance Assessment: By incorporating the CPU-to-GPU copy speed, the GCC module provides a more holistic assessment of the overall system performance, considering potential bottlenecks in data transfer Matrix multiplication is a fundamental operation in linear algebra, and it is central to the workings of Artificial Intelligence, particularly in both training and inference of machine learning models. Let's break down what it is and why it's so vital.

At its core, matrix multiplication is a method for combining two matrices (rectangular arrays of numbers) to produce a third matrix. It's *not* simply multiplying corresponding elements like you might expect. Instead, it involves a specific process of row-by-column dot products.

As a simplified explanation, consider two matrices, A and B. To find an element in the resulting matrix C (where C=A×B), take a row from matrix A and a column from matrix B, multiply corresponding elements, and sum the results. This single sum becomes the value of that specific element in matrix C. Repeat this process for every row in A and every column in B to build the entire resulting matrix.

For example:

$$A = \begin{vmatrix} 1 & 2 \\ 3 & 4 \end{vmatrix}$$

$$B = \begin{vmatrix} 5 & 6 \\ 7 & 8 \end{vmatrix}$$

$$C = A \times B = \begin{matrix} |(1^*5+2^*7) & (1^*6+2^*8)| & = & |19 & 22| \\ |(3^*5+4^*7) & (3^*6+4^*8)| & = & |43 & 50| \end{matrix}$$

The significance of matrix multiplication in AI stems from how it represents and manipulates data within neural networks, the building blocks of many modern AI systems. Here's a breakdown of its role in both training and inference:

1. AI Training (Learning):
   - Weight Updates: Neural networks "learn" by adjusting the weights (numerical values) of connections between artificial neurons. These weights are organized into matrices. During training, the network calculates the error between its predictions and the actual values. This error is then used to update the weight matrices using techniques like gradient descent. Matrix multiplication is *essential* for calculating these gradients—the direction and magnitude of the weight adjustments.
   - Forward and Backward Propagation: The process of training involves two main phases: forward propagation (calculating the output of the network) and backward propagation (calculating the error and updating the weights). Both of these phases heavily rely on matrix multiplications to transform data through the layers of the network.
   - Large-Scale Data Processing: AI models are often trained on massive datasets. Matrix multiplication provides an efficient way to process this data in parallel, making the training process feasible.
2. AI Inference (Prediction):
   - Transforming Input Data: When you use a trained AI model to make predictions (inference), the input data is first transformed into a numerical representation (often a vector or matrix). This data then passes through the layers of the network, where it undergoes a series of matrix multiplications.
   - Feature Extraction: Each layer of the network performs a specific transformation on the data, extracting relevant features. These transformations are implemented using matrix multiplications.
   - Generating Output: The final layer of the network produces the output (e.g., a classification label, a predicted value). This output is also calculated using matrix multiplication.

In essence:

- Most neural networks are fundamentally matrix operations. The entire process of learning and making predictions can be expressed as a series of matrix multiplications and additions.
- Efficiency is significant. The speed of matrix multiplication directly impacts the performance of AI models. This is why there's a huge focus on optimizing matrix multiplication algorithms and leveraging specialized hardware (like GPUs and TPUs) to accelerate these calculations.

Because of its central role, advancements in matrix multiplication techniques have consistently driven progress in the field of AI. Faster and more efficient matrix multiplication allows for the development of larger, more complex models that can tackle increasingly challenging problems.

Both training and inference in modern Artificial Intelligence, particularly in areas like computer vision and deep learning rely on Convolutions on GPUs.

Convolutions are a mathematical operation used to process data with a kernel (also called a filter). In the context of AI, especially Convolutional Neural Networks (CNNs), this kernel slides across an input (like an image), performing element-wise multiplication and summation.

An Input is an image represented as a grid of pixel values. A Kernel is a small matrix of weights (e.g., 3×3, 5×5). These weights are the learnable parameters of the neural network. In a Convolution Operation the kernel is moved across the input image, and at each location, it performs the following:

1. Element-wise multiplication between the kernel values and the corresponding input pixel values.
2. Summation of all the multiplied values.
3. The result of the summation becomes a single value in the output feature map.

This process is repeated for every location in the input image, creating a feature map. Multiple kernels are typically used in a convolutional layer, each learning to detect different features (edges, corners, textures, etc.).

Convolutions are significant in AI for reasons including the following:

- Feature Extraction: Convolutions automatically learn hierarchical features from raw data. Early layers might detect simple features like edges, while deeper layers combine these to detect more complex objects.
- Spatial Relationships: Convolutions preserve spatial relationships in the data, which is crucial for image and video processing. Unlike fully connected layers, convolutions consider the arrangement of pixels.
- Parameter Sharing: The same kernel is applied across the entire input, reducing the number of learnable parameters and making the model more efficient.
- Translation Invariance: Convolutions are relatively insensitive to the location of a feature in the input. A feature detected in one part of the image can be detected in another part.

While convolutions can be performed on a CPU, GPUs typically offer a massive performance advantage. Here's why:

- Parallelism: Convolutions are inherently parallelizable. The calculation of each element in the output feature map is independent of the others. GPUs have thousands of cores designed for parallel processing, allowing them to perform these calculations simultaneously. CPUs, on the other hand, have fewer, more powerful cores optimized for sequential tasks.
- Memory Bandwidth: GPUs have significantly higher memory bandwidth than CPUs. Convolutions involve a lot of data movement (reading input data, weights, and writing output data). High memory bandwidth is crucial to keep processing cores fed with data.

- Optimized Libraries: Libraries like NVIDIA CUDA and OpenCL provide highly optimized routines for performing convolutions on GPUs. These libraries take advantage of the GPU's architecture and provide efficient implementations of the convolution operation.
- Data Locality: GPUs are designed to keep data close to the processing cores, reducing the latency of data access.

GPUs commonly have special mechanisms to accelerate convolutions, such as:

1. Tiling/Im2col: A common optimization technique is to divide the input image and kernel into smaller tiles. This allows the convolution operation to be performed on smaller blocks of data, improving data locality and cache utilization. The 'im2col' (image to columns) transformation reshapes the input image into a matrix where each column represents a receptive field of the kernel. This allows the convolution to be expressed as a matrix multiplication, which is highly optimized on GPUs.
2. Winograd Convolution: This is a fast convolution algorithm that reduces the number of multiplications required, at the cost of increased additions. It's particularly effective for small kernels.
3. FFT Convolution: For large kernels, using the Fast Fourier Transform (FFT) can be more efficient. The convolution operation is transformed into a multiplication in the frequency domain.

During training, CNNs need to perform a huge number of forward and backward passes. Each pass involves numerous convolution operations. Without GPUs, training deep CNNs would be impractically slow.

- Faster Iterations: GPUs significantly reduce the time it takes to complete a single training iteration (processing a batch of data). This allows researchers and engineers to experiment with different architectures and hyperparameters more quickly.
- Larger Models: The ability to train models faster enables the development of larger and more complex models with more layers and parameters. These larger models often achieve higher accuracy.
- Larger Datasets: GPUs allow for the training of models on larger datasets, which can improve generalization performance.

Once a model is trained, it can be used to make predictions on new data, called inference. GPUs are also crucial for efficient inference, especially in real-time applications.

- Low Latency: GPUs reduce the latency of inference, making it possible to process data in real-time. This is essential for applications like self-driving cars, object detection, and video analysis.
- High Throughput: GPUs can process a large number of inputs simultaneously, increasing the throughput of the inference pipeline.
- Edge Computing: GPUs are increasingly being deployed on edge devices (e.g., smartphones, cameras) to perform inference locally, reducing the need to send data to the cloud.

There are some instances where the selection of the appropriate clients can benefit greatly from the internal knowledge of the module being called. One example is whether a large dependency is installed on the client, for example a specific language model data file. While it's possible to route a request to a client that doesn't have the model installed and has the model installed on the fly, this is impractical for requests where a user is waiting for a response in seconds. In this specific example, having the AI processing module guide the processing algorithm is useful.

The mechanism for hooking in the custom module to the distribution algorithm is during the phase when it has shortlisted a set of machines that meet the criteria and is in the process of checking whether the module itself is installed on the machine. The distribution algorithm checks the modules on machines table in the datastore looking for the relationship, but also looks for the presence of a JsonBlob field that was generated by the module on the client at initialization. Given the Json nature of the field, it can store any content that it deems necessary and is something opaque to the Service system. When this field is found it is brought into the distribution algorithm and the "router" component packaged in the module archive is called first to determine which ordinal parameter of the request to provide. Then the router component is called with the request value at the ordinal and the JsonBlob. If the routers logic returns 0, the implication is that this is a good client to route to, if the return code is positive, it tells the distribution algorithm that the client choice is suboptimal but not a showstopper and if the response is negative, the distribution algorithm must not route to this device.

One point of discussion is what a suboptimal choice would represent. Taking the AI model example, a response of +2 might represent that the language model is present on the client, but a different model is currently loaded and the act of routing the current request to the machine might result in a 10 to 15 second delay where one language model is being evicted and the new one is being loaded in and initialized.

Other relevant points of this mechanism are that to protect its integrity, in some embodiments, Service launches a separate process to do router evaluations so that this code is never hosted internally in the system. Additionally, interactions of ordinal and router lookup for a machine are cached in the Service to avoid redundant router evaluations for a particular client in future.

Those skilled in the art will appreciate that the acts shown in FIG. 2 and in each of the data flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

FIG. 3 is a table diagram showing sample contents of a client information DB table used by the facility in some embodiments as a basis for routing each request to a particular client. The table 300 contains a number of rows each corresponding to a different client instance, such as rows 301-305. Each of the rows is divided into the following columns: a client identifier column 311 contains an identifier used by the facility to identify the client. In some embodiments, this identifier is capable of distinguishing between multiple instances of the facility's client software running on a single client device. In some embodiments, the identifier includes information about an identifier assigned to the client device externally to the facility, such as an IP address, a different network address, or another identifier assigned by a network router or other networking equipment. The columns also include a video adapter column 312 identifying a type of video adapter installed in the client device, such as via manufacturer, product name, product level, etc. The columns further include a vRAM column 313 indicating an amount of video RAM installed and/or available in the client's video adapter. The columns further include a connected column 314 indicating whether the client device is reachable by the facility via the network, and a connected time column 315 indicating an amount of time for which this has been true. The columns further include an OnAC Power column 316 indicating whether the client device is operating on power from its battery, or from an external power source such as a wall outlet. The columns further include a Battery Percent column 317 indicating the charge level of the client device's battery. The columns further include an IdleSecs column 318 indicating the number of seconds that have elapsed since the client device last received input from its local user, or performed computational actions responsive to such input. The columns further include a SystemCalcCapability metric determined by the facility for the client device, described in detail above. A GraphicsCalcCapability column 320 contains a value for this metric determined for the client device as described above. A ConnectionHub column 321 contains information identifying a connection hub device on the network that is assigned to intermediate communications between the service device and the client device to which the row corresponds, in this case, the IP address of that Connection Hub. A ModelsInVRam column 322 identifies any machine learning models or other module-specific data sets presently stored in the video RAM of the client device's video adapter. A ModelsOnDisk column 323 similarly identifies models or other data sets that are stored persistently on disk by the client device. For example, row 302 describes a client having client ID 572, in which is installed an Intel Iris Xe Graphics video adapter having 128 MB of vRAM. The client device is presently connected, and has been 30 minutes and 35 seconds. It is operating on power from its battery, which is 98 percent full. It has been idle for 9,013 seconds. Its SystemCalcCapability measure is 186509, and its GraphicsCalcCapability is 35437. A service connects to it via a Connection Hub having IP address 10.0.0.148. It has the following machine learning model both stored on disk and loaded into RAM: granite3-moe: 1b/1.3B.

While FIG. 3 shows a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

A sample request is shown below in Table 1.

TABLE 1

```
{
// This is a request to per-Form a synchronous AI query using the module
                                        mycai.py and granite3-moe:lb LLM
"Module":"MycAI.py",
"Interpreter":"pythonw.exe",
"Version":1.5,
"Secr":"{\"USERDOMAIN\":\"DV-1\"\"USERNAME\":\"xyzuser\",\"USERDNSDomain\":
                                        null}",
"Origin":"DV-1",
"CustomerKey":"tNd+hkMAXuCXwno5ty+fGkzn9m0BYFuJLz1KH+/00P4=",
"Hints":226,
"ContextIn":"[49152, 2946, 49153, 4282, 884, 1115, 6527, 6218, 9192, 312,
                                        17247, 19551, 47330, 810, 1593, . . .
"CmdLineParms":["granite3-moe:1b"],
"FileAttachments":[
{
"FileName":"uN2q7sMccc.txt","MimeType":"text/plain",
                                    "FileSize":7,"Base64Content":"VGhhbmtzIQ=="
},
{
"FileName": "dymxPCX6hZ.txt",
"MimeType": "text/plain",
"FileSize": 7,
"Base64Content": "WzQ5MTUyLCAyOTO2LCA0OTE1MywqNDI4MiwgODg0LCAxMTE
                                        1LCA2NTI3LCA2MjE4LCA5MTkyLCAZ . . .
}
],
"UniqueIndx":" ",
"EndVisible0utputSignal":"<Context>[",
"DbgForceClient":null,
"ClientTimeStamp":"2025-04-29T14:47:16.5183276Z"
}
```

The request is sent to the Service endpoint, such as via HTTPS POST. The Service consults the client information DB table and its routing algorithm to determine which workload processor Client delegated the request to. The Service also checks to see if the module being requested needs to be installed on the Client and will add a flag to intermediate data structure that it requires installation. The specific record in the machine table contains the instance of Conns (websockserver) the Client is connected to and the Service sends to that endpoint over https. The Connection Hub then looks at the request, determines whether the "Module install" is set. Then checks its own cache as to whether it has the binary/script. If not, it calls into the Service to download into its cache. Connection Hub attaches binary/script to request and forwards to message on (over secure websocket protocol) to the instance of Client running on the PC. The Client executes the work and starts composing the response. For AI and other requests, in some embodiments, it streams tokens back to the originating client.

In some embodiments, when the facility receives the request shown in Table 1 at a time when the client information database table has the contents shown in FIG. 3, it proceeds as follows. The facility begins by considering clients on which are installed the module specified by the request in line 15: granite3-moe:1 b/1.3B: client 572 shown in row 302 of the db table and client 109 shown in row 304 of the db table. For each of these, the facility determines whether the client has a significant volume of vRAM, such as a volume over 4 GB, as this helps facility the execution of this machine learning model. Because neither of these two clients has such a high volume of vRAM, the facility considers the relative SystemCalcCapability of these clients, and finds this metric for client 572 shown in row 302 to be significantly higher. Accordingly, the facility chooses client 572 to service the request shown in Table 1. Had these two clients had similar processing capabilities, but one of them had had the model loaded in vRAM while the other did not, the facility would have chosen the client having the model loaded in vRAM. In some embodiments, the facility eliminates from consideration clients having a disqualifying characteristic, such as those in active use by their local user (shown by a low idle secs count), or clients operating on a battery whose charge level is low, or a client that is presently disconnected, and cannot successfully be reconnected. In some embodiments, where a suitable client cannot be found that has the model specified by the request installed and stored on disk, the facility considers clients that may be effective at executing the model or other module, on which the facility would install the model or other module in order to process the request. In some embodiments, multiple versions of a model or other module having varying capabilities exist, at least some of which are available in the facility. In such cases, the facility can permit the use of a different version of the model, such as a more powerful version consuming more resources, or a less capability likely to produce results of lower quantity. In some embodiments, the facility's consideration of other versions of a model is gated by a hint, such as the ModelDowngradeOK hint discussed above, or a corresponding ModelUpgradeOK hint.

A sample results for the sample request in Table 1 is shown below in Table 2.

TABLE 2

```
{
// Responses are chunked so as tokens are generated for a synchronous user,
        they are sent back // The message represents
        the final chunk of a response
        EndOfResponse=true
“CallResponseCode”:0,
“ContextOut”: “[49152, 2946, 49153, 4282, 884, 1115, 6527, 6218, 9192, 312,
        17247, 19551, 47330, . . .
“ClientTimeStamp”:“2025-04-29T14:47:16.5183276Z”,
“ServerTimeStamp”:“2025-04-29T14:47:26.328245Z”,
“MYCInternalResponseTm”:“00:03:09.2655067”,
“Output”: “welcome”,
“UniqueID” : “572: //11812>MzM1NTQ0MzIWMDA=QU1ENjQ=OA==SW50ZWw2NCBGYW1pb
        HkgNiBNb2R1bCAxNDAgU3R1cHBpbmcgMSwgR2VudW1uZU1u
        dGVs”,
“RegID”:“20250429:075437.0714-DV-14:10892-09ale5e54d894a3c89bla0f2bc78558
        0--11812--192.168.50.100:5004”,
“wsError”:0,
“ExecutionTime”:“00:00:09.3394250”,
“ExecutionPrivateBytes”:3592192,
“ExecutionWorkingSet”:6860800,
“TotalProcessorTime”:“00:00:00.4062500”,
“UserProcessorTime”:“00:00:00.3593750”,
“RoundTripTime”:“00:00:00”,
“ExceptionMessage”:null,
“EndOfResponse”:true\
}
```

Figure 4:
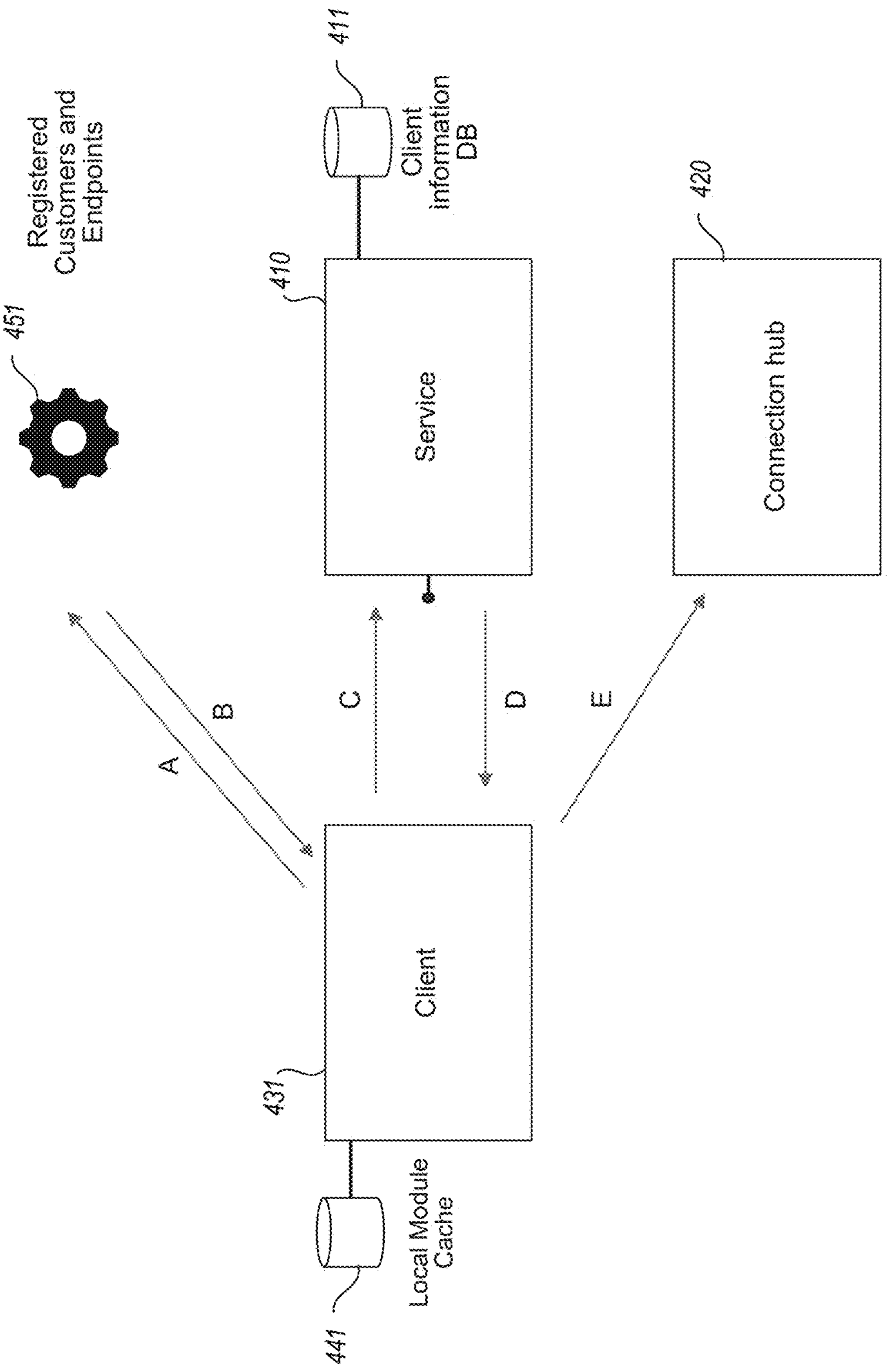
FIG. 4 is a data flow diagram showing the initialization of the Client software components running on network nodes.

FIG. 4 is a data flow diagram showing the initialization of the Client software components running on network nodes.

First, upon its startup, the Client component 431 locates the service 410, such as by domain name and listening port. The Client utilizes local domain connection information and configured service account login credentials to ask the system directory 451 for the IP address of the Service, in Flow A. Flow B represents the response from the system directory which contains IP address/port pairs for 1 of more instances of Service. This serves multiple purposes; it allows scale-up of the system and provides greater reliability and failover should one instances of Service fail or is unreachable.

Before registering with Service, in some embodiments, the client gathers the following information about all the local modules installed by looking at its local AppRoot directory 441. If these files aren't found, it initializes an AppRoot in anticipation for new modules being sent down. If they are found, the app details are enumerated; if any of the modules have a router component (discussed above), that router will be run on the client to generate its unique context to be recorded with the modules on machine record in the DB.

Next, the client gathers machine registration data to enable the request distribution module to make decisions. In some embodiments, this data includes and is not limited to machine name, process identifier where the Client code is running, IP addresses, operating system, OS version, a unique hardware identifier consisting of a hash of the processor ID and the baseboard id, Physical ram installed, Free Ram, Processor information, Time zone, Local Time and UTC Time, whether on AC/Battery and battery status, latest system capability metric calculation (cached), Runtime Performance snapshot (Average CPU, % CPU over80, average pages/sec, Average disk queues), how long the OS has been running, details on graphics adapters installed.

In some embodiments, the facility composes this information into a Json-based registration request and that registration request is sent to Service in Flow C. On receipt of this message, Service generates a Unique ID for the Client instance based on the hardware attributes, and attempts to add all the registration information into the Client information DB record indexed on the newly generated Unique ID.

Flow D represents the response message to the registration request if all the information is validated and added correctly. Part of this response message includes the instance 420 of Connection Hub that has been selected for this client to connect to. This mechanism provides a scale-up and reliability benefit.

Once Client gets back a successful registration response, it uses the Connection Hub IP address and port to connect to the appropriate Connection Hub instance over WebSockets. This is represented by Flow E. If this is successful, the Client is ready for processing work which will come via request messages over the Connection Hub connection.

In some embodiments, registration information that is dynamic in nature is updated periodically (such as every few minutes) with the Service. It is helpful for Service to keep a near real-time record of the state of the node to aid it in its routing decisions to ensure that it is not overloading an Client or impacting the interactive user experience.

Figure 5:
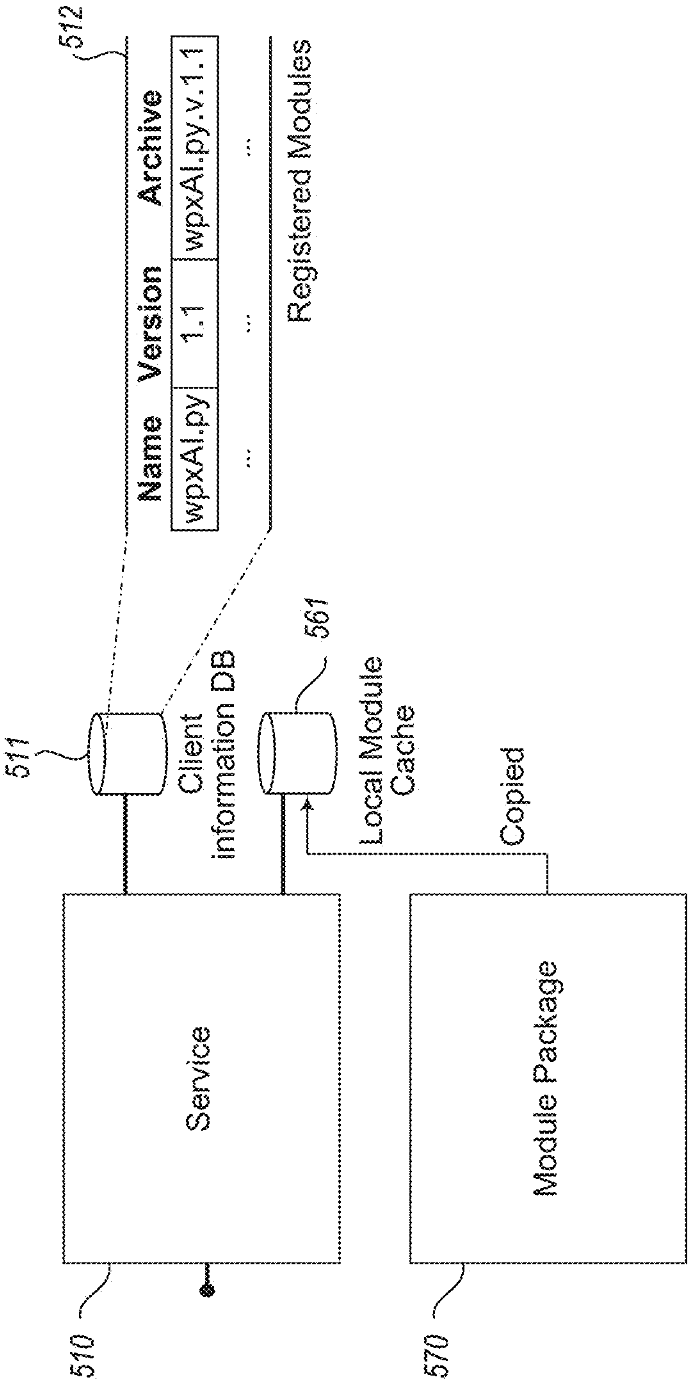
FIG. 5 is a data flow diagram showing a process used by the facility in some embodiments to add a new module to the overall system.

FIG. 5 is a data flow diagram showing a process used by the facility in some embodiments to add a new module to the overall system. The process requires administrative privilege on the computer hosting Service. Once a module is registered in the system, it is distributed to the clients on demand (when a client is chosen to do work, subject to client request rules).

Package 570 is to be deployed. A package can be a .zip file or other kind of standard archive used to package a set of files in a directory structure while compressing the overall package. It is the responsibility for those preparing the modules to be deployed to package all the relevant pieces for their module to run, this includes primary binaries for module functionality and small data stores. This doesn't include large files (e.g., tens of megabytes) and does not include large groups of dependencies. In some embodiments, these large data stores or dependency processing that takes a long time, are handled by system administrators to ensure appropriate dependencies are distributed to the set of nodes that will run Clients. The reason for this is that the facility's built-in distribution system happens on demand and usually when a human being has initiated a request and is waiting for a response. Long latencies in this process are undesirable.

The facility can run anything that can be run on the client platform. This means that if the node running Client is a Windows PC, the items in the archive can be native Windows binaries (built in any language that can generate Windows native binaries), PowerShell scripts, command files, built in system commands, python scripts, etc. It is also possible to mix these items within a module archive.

In some embodiments, the facility gets the package to the Service component by copying it to the APPROOT directory 561 on the systems running Service 510 (by default in Windows the is the % USERPROFILE%\AppData\MYCService\AppCache\directory). In some embodiments, the package is unarchived and components are signed with the service machinekey, or a signature file is generated depending on the type of component—for example, the facility generates a binary for a python script .py, which can't have a signature included in its code.

The facility informs the Service 510 that the package is there. Again, the process requires administrative level access to the computer and the service. A RegisteredModules table 512 in the client information DB is updated with a new record which contains the base module name (e.g., "wpxAI.py"), the version of this component (e.g., 1.1), and the archive file name with the extension omitted (e.g., wpxAI.py.v.1.1). The facility is designed to allow for multiple versions of a component to be in use at the same time and therefore a module can have multiple rows in this table.

Figure 6:
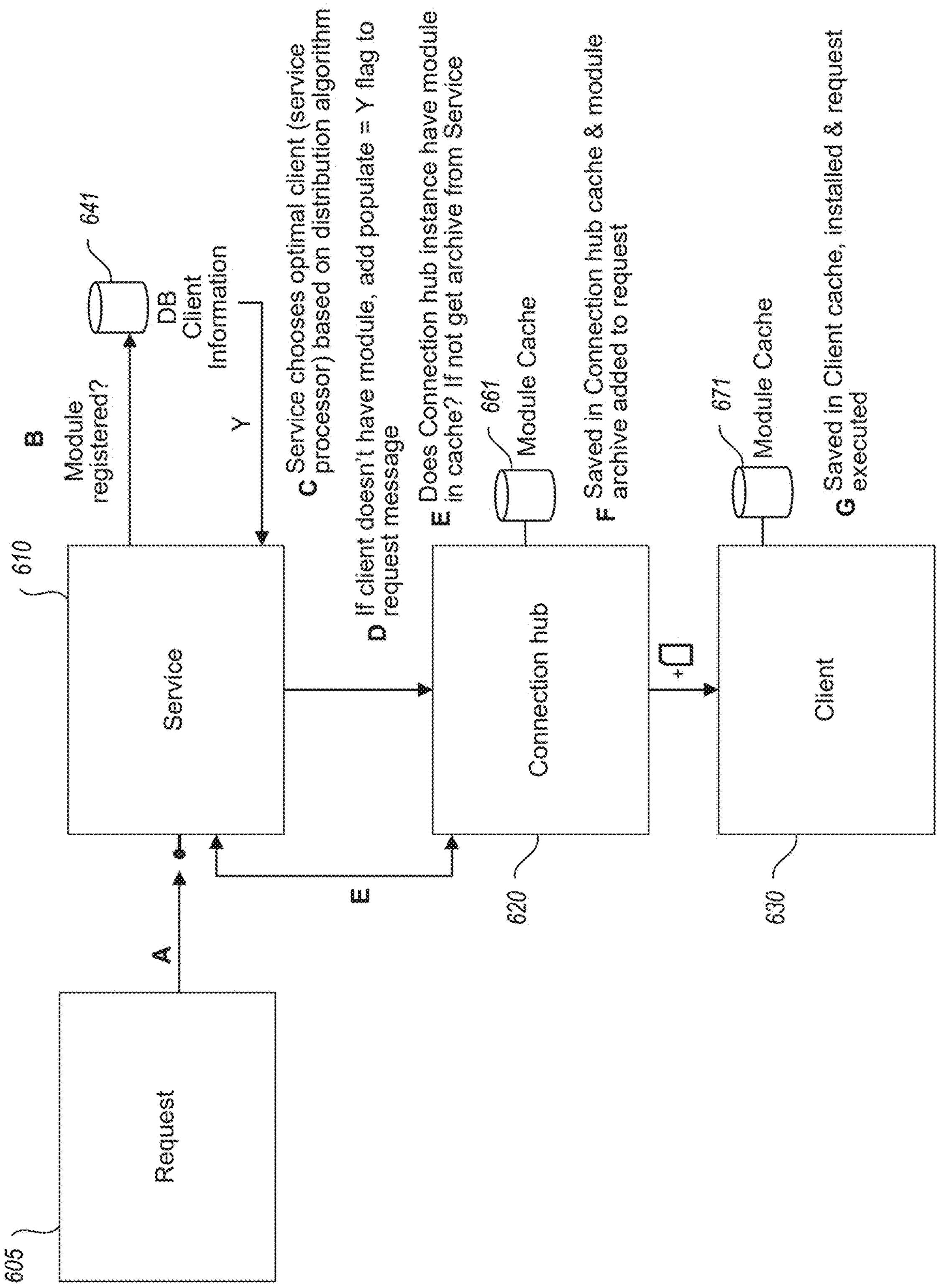
FIG. 6 is a data flow diagram showing a process used by the facility in some embodiments to distribute a modules to clients and intermediaries.

FIG. 6 is a data flow diagram showing a process used by the facility in some embodiments to distribute a modules to clients and intermediaries. As discussed, in some embodiments, the modules are installed and registered into the overall system once. The facility then takes charge of distributing them to the client in an on-demand fashion. An underlying assumption is that an end user is waiting on a request so the transfer of a module and installation of a module should happen within seconds to not impact system responsiveness.

Shown request is for a module that has already been registered "wpxAI.py". Flow A calls into Service 610 requesting the execution of the module with associated hints and other relevant information attached to the Json request.

In Flow B, Service checks its data store in client information DB 641 to verify that the module and version are in fact registered and valid in the system. In this example, the module is registered correctly, and the process continues.

In Flow C, Service determines the optimal client for the request, discussed in greater detail above in connection with FIGS. 2 and 3. Once a client is selected, Service can tell whether the client has the module installed or not.

In Flow D, Service sends a message to the instance 620 of Connection Hub associated with the client. Because this client needs the module, a flag on the message is set to indicate that the Connection Hub instances should send the binaries along with the request for running the module. The Connection Hub instances cache the modules that pass through them and have better locality to the client in general than the Service instances. Therefore, in some embodiments, the Connection hub processor sends the binaries.

In Flow E, the Connection hub component receives the message from Service. If the message is instructing the Connection hub component to populate the binaries, it checks its own local cache 661 to see if in fact it has the binary itself. If it does not, Connection Hub makes a Json request to Service to get a copy of the binary for its local app cache.

In Flow F, Connection Hub stores the copy of the binary in its local cache for future use and attaching a copy of the binary into the request it is sending on to the Client.

In Flow G, the client 630 receives the module execution request for wpxAI.py and the fact that the binaries for the module are attached to the request. The Client unpacks and installs the module into its App Cache 671, verifies the signature is valid and executes the module with the parameters and other instructions contained in the request. At the completion of the request, the client returns response to the originating requestor.

When the Service sees the response to the originating client, it also updates its records to now record the fact that the chosen client has the module installed for future reference. In some embodiments, the client now also sends up information that the module is installed when it starts up in future as part of the registration sequence.

As can be seen by FIG. 2, there are several components and pathways in the default route of a request and response through the system. For any complex production system or cloud architecture, this is not particularly unexpected but there is the plan to improve this in the case where the origination client and client are on the same network segment or can connect to each other directly. In this case, where the originating requestor and client are on the same network segment, in some embodiments, the call to Service triggers a message to the chosen client (Client) to expect a WebSocket connection from a peer. This message also has the usual logic of containing the binaries if the Client doesn't already have them for the module. Service will then send a redirection response to the originating client with instructions to connect to a particular WebSocket on a client for the request. In this case, the client handles the request in the usual way, composes the response and responds directly to the end client reducing network latency and improving efficiencies on the overall system. When the request is competed, Client also sends a low priority asynchronous message to Service to inform of the work being completed.

In some embodiments, the facility uses client devices other than traditional PCs and Macs. In some embodiments, core Client logic and processes are hosted on a variety of platforms, including Internet of Things (IoT) devices, virtual machines, and even server-class hardware running either Linux or Windows Server operating systems. Since the facility already understands the specific type of endpoint running Client, administrators would also need to provide tailored versions of software for each platform. This means creating archives containing executables, binaries, and scripts optimized for the unique characteristics of IoT devices, virtual machines, or different server operating systems.

In some embodiments, the facility "wakes up" client devices to allow them to accept requests. Waking up in this context means bringing devices out of a low power state or unpowered state into a state where they can run operating system and application code. This is typically bringing a device from a low power or sleep state to "running" state. This can be useful as the preferred mode of running endpoint devices hosting Client software is to allow them to drift into sleep to save power. Service tracks the AC status and battery percentage for a device and can make intelligent decisions about which devices to wake and schedule work on.

In some embodiments, the facility uses simulated clients for testing. These simulations are achieved by creating "clients" with predetermined responses stored in files. Each file would contain both the response itself and metadata about the delay before sending it and other items. The system directs requests all the way through Connection Hub, where the logic for simulating a client resides. This approach allows developers to easily scale their tests, simulating hundreds or thousands of clients without needing actual hardware.

In some embodiments, the facility implements a model pre-load feature, according to which it tracks and predicts which models are specified in requests, and triggers certain clients to pre-load models peremptorily to their vRAM based upon these predictions. The primary objectives of the Model Pre-load feature are: (1) ensure that essential models are readily available in vRAM when needed to minimize latency and optimize processing and (2) adapt to changing workload patterns and customer usage habits by incorporating cyclical patterns (monthly, yearly) and weekly refinement based on recent usage.

In some embodiments, the Model Pre-load feature considers multiple factors:

1. Weekly Data Patterns The facility combines data from the current week with cyclical patterns (month, year) to determine the set of Large Language Models (LLMs) that should be preloaded into vRAM.
2. Cyclical Patterns The feature takes into account annual and monthly cyclical patterns, such as end-of-month reporting, to anticipate changes in workload and adjust preloading accordingly.
3. Weekly Refinement Based on recent usage data, the facility refines its model selection for each week, ensuring that the most relevant models are loaded into vRAM.
4. Model Tracking The feature tracks every model used and how often it is used on which machines to inform future preloading decisions.

In some embodiments, the Model Pre-load feature performs data collection to determine the preferred set of LLMs for each machine as follow:

1. Initial Data Collection For new customers, the facility tracks every model used and its usage frequency over a week.
2. Baseline Calculation After two months of tracking data, the feature calculates the baseline set of preloaded models based on:
   The first week of each month (70% weight)
   Recent usage over the last week (30% weight)
3. Ongoing Data Collection and Recalculation As more data becomes available, the facility recalculates the preferred set of LLMs using a weighted average of:
   The first week of each month
   Recent usage In some embodiments, after 12 months of runtime, the feature considers additional factors to further optimize model preloading, such as:

1. Week of the Year Aspect The facility incorporates data from all weeks of the year (except for the current one) to calculate a more comprehensive baseline.
2. Weighted Average Calculation The feature uses a weighted average of:
   The first week of each month (e.g., 55% weight)
   LLM usage of week 9 of the previous year (e.g., 15% weight)
   Recent usage over the last week (e.g., 30% weight)

To further enhance model preloading, the feature tracks all LLM misses (work being routed to a machine which model was not loaded). Customers can:

1. Recommend Model Instances. Provide (hard coded) recommendations to the overall facility for pre-allocating specific instances of models. Will drop less used ones.
2. Purchase Additional Hardware. Decide to purchase hardware with specifications that cover the missed LLM invocations. Or upgrade users' PCs in the normal upgrade cycle with appropriate hardware specs to accommodate misses.

The Model Pre-load feature optimizes model preloading for facility applications. By combining cyclical patterns, weekly refinement, and ongoing data collection, it ensures that necessary models are readily available in vRAM when needed, minimizing latency and optimizing processing. The feature's features and ability to adapt to changing workload patterns make it an essential component of the facility.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed by one or more processor in a routing computing system for dynamic request routing, comprising:

receiving from a requestor computing system a request specifying a computing task to be performed, the request comprising:

information identifying a machine learning model and a machine learning model version, and model input to which the identified version of the identified machine learning model is to be applied;

accessing a client status resource, for each of a plurality of client computer systems in a local network, private network, or corporate network, each configured and assigned for use by a local user, wherein the client status resource indicates:

a level of availability of the client computer system to perform external requests, based at least in part on a level at which a local user of the client computer system has recently used the client computer system, and a level of suitedness of the client computer system to perform external requests, based at least in part on:

a level of availability of the identified version of the identified machine learning model for operation on the client computer system; and a predicted level of performance of the client computer system in operating the identified version of the identified machine learning model, wherein the predicted level of performance is determined by:

obtaining a base performance metric for the client computer system by causing the client computer system to execute a loop operation using the identified machine learning model during the loop operation;

determining an average central processing unit (CPU)-to-graphics processing unit (GPU) copy speed of the client computer system; and determining the predicted level of performance based on a combination of the base performance metric and the average CPU-to-GPU copy speed;

using the client status resource to select one of the plurality of client computer systems; causing the request to be delegated to the selected client computer system via a client component installed on the selected client computer system; and in response to the request being delegated to the selected client system, causing the selected client computer system to:

install the identified version of the identified machine learning model;

execute and apply the identified version of the identified machine learning model to the model input for processing the computing task;

process the computing task; and provide a result of executing and applying the identified version of the identified machine learning model to the model input to the requestor computing system.

2. The method of claim 1 wherein the identified machine learning model is a language model, and wherein the model input comprises a prompt.

3. The method of claim 1 wherein the requestor computing system, routing computing system, and selected client computer system are all connected by the local network, private network, or corporate network.

4. The method of claim 3 wherein causing the request to be delegated conveys the request to a connectivity hub computer system designated for the selected client computer system, the requestor computing system, routing computing system, connectivity hub computer system, and selected client computer system all being connected by the local network, private network, or corporate network.

5. The method of claim 1, further comprising:

determining that the identified version of the identified machine learning model is not installed on the selected client computer system; and in response to the determining, causing the identified version of the identified machine learning model to be installed on the selected client computer system.

6. The method of claim 1, the method further comprising:

receiving an indication originated by the client component installed on the selected client computer system indicating that performance of the request by the selected client computer system was interrupted by use of the selected client computer system by a local user of the client computer system; and in response to receiving the indication, repeating the accessing, using, and causing with respect to a second selected client computer system different from the selected client computer.

7. The method of claim 1 wherein the selected client computer system has video random access memory (vRAM), and wherein the level of availability of the identified version of the identified machine learning model for operation on the selected client computer system is that the identified version of the identified machine learning model is loaded into the vRAM of the selected client computer system.

8. The method of claim 1 wherein the selected client computer system has video random access memory (vRAM), and wherein the level of availability of the identified version of the identified machine learning model for operation on the selected client computer system is that the identified version of the identified machine learning model is installed on the selected client computer system, but is not loaded into the vRAM of the selected client computer system.

9. The method of claim 1 wherein the level of availability of the identified version of the identified machine learning model for operation on the selected client computer system is that the identified version of the identified machine learning model is installed on the selected client computer system, the method further comprising:

causing the identified version of the identified machine learning model to be installed on the selected client computer system before performance of the request by the selected client computer system.

10. The method of claim 1 wherein the level of availability of client computer system to perform external requests indicated by the accessed client status resource for each of the plurality of client computer systems is further based at least in part on a level of energy available to the client computer system to perform external requests.

11. The method of claim 1 wherein the predicted level of performance of the client computer system in operating the identified version of the identified machine learning model is empirically determined by the client component installed on each client computer system of the plurality.

12. The method of claim 11 wherein the empirical determination is of:

performance of one or more central processing units (CPUs) of the client computer system, and/or performance of one or more graphics processing units (GPUs) of the client computer system.

13. The method of claim 1, further comprising:

accessing a set of hints applicable to routing the received request, comprising one or more of:

a hint indicating that a version of the indicated model other than the indicated version can be applied, a hint indicating that performance of the request is bound by central processing unit (CPU) performance level, a hint indicating that performance of the request is bound by graphics processing unit (GPU) performance level, a hint indicating that performance of the request is bound by video random access memory (vRAM) size, a hint indicating that performance of the request is bound by disk access speed, a hint indicating that performance of the request can be asynchronous, a hint indicating that the request should be routed to a client computer system on which the apply the identified version of the identified machine learning model is already installed, a hint indicating that the request should be routed to a client computer system to which no request for the indicated version of the indicated model has been previously routed, until a request for the indicated version of the indicated model has been routed to all computer systems, a hint indicating that the request is for a chunk of a decomposed request, a hint indicating that the request is for a final chunk of a decomposed request, a hint indicating that a less powerful model than the indicated version can be substituted, a hint indicating that a more powerful model than the indicated version can be substituted, and wherein selecting further uses the accessed set of hints to select the selected client computer system.

14. The method of claim 13 wherein the accessed set of hints are specified as part of the request.

15. The method of claim 13 wherein the accessed set of hints is specified for the identified version of the identified machine learning model.

16. The method of claim 1, further comprising:

before causing the request to be delegated to the selected client computer system, causing the selected client computer system to be awakened from a sleep state, a hibernate state, or a powered-off state.

17. The method of claim 1, further comprising:

before causing the request to be delegated to the selected client computer system, causing one or more additional client computer systems including the selected client computer system to be added to the plurality of client computer systems.

18. The method of claim 1, further comprising:

(a) receiving information about status of a distinguished client computer system of the plurality; and (b) in response to receiving the information, updating the client status resource to reflect the received information, and wherein it is the updated client status resource that is accessed and whose contents are used to select the selected client computer system.

19. The method of claim 1, further comprising:

receiving an indication of a version of an indicated machine learning model not installed on any of the plurality of client computer systems;

in response to receiving the indication:

accessing code and data for the indicated version of the indicated machine learning model;

causing the accessed code and data to be stored in at least one installation cache; and for each of one or more of the plurality of client computer systems, causing an instance of the accessed code and data stored in one of the one or more insulation caches to be installed on the client computer system.

20. The method of claim 19, further comprising:

in connection with receiving the indication, receiving custom routing logic for the indicated version of the indicated machine learning model;

storing the received custom routing logic for the indicated version of the indicated machine learning model;

receiving a second request that identifies the indicated version of the indicated machine learning model; and causing the second request to be delegated to a client computer system selected using the stored custom routing logic.

21. The method of claim 1, further comprising:

logging requests received by the routing computing system during a logging period, in a way that captures, for each request received by the routing computing system during the logging period:

a point in time at which the request was received, and the machine learning model and version identified by the request, analyzing the logged requests to produce analysis results identifying timing-based frequency patterns among the logged requests for individual versions of machine learning models; and based on a current point in time and the analysis results:

causing a first machine learning model version to be installed on at least one of the plurality of client computer systems;

causing a second machine learning model version to be loaded into video random access memory (vRAM) of at least one of the plurality of client computer systems;

causing a third machine learning model version to be unloaded from vRAM of at least one of the plurality of client computer systems; and/or causing a fourth machine learning model version to be uninstalled from at least one of the plurality of client computer systems.

22. The method of claim 1, further comprising:
decomposing the request into a plurality of chunks;
repeating the selecting and causing for each chunk of the request;
receiving a constituent result for each chunk; and
composing the received constituent results into a result for the request.

23. One or more computer memories collectively containing a client status data structure for a plurality of software modules, the client status data structure comprising:
for each of a plurality of client computer systems in a local network, private network, or corporate network, each comprising one or more processors and configured for use by a local user:
a level of availability of the client computer system to perform external requests, based at least in part on a level at which a local user of the client computer system has recently used the client computer system, and
a level of suitedness of the client computer system to perform external requests, based at least in part on:
for each of the plurality of software modules, a level of availability of the software module on the client computer system; and
a predicted level of performance of the client computer system in executing the software module, wherein the predicted level of performance is determined by:
obtaining a base performance metric for the client computer system by causing the client computer system to execute a loop operation using one or more of the plurality of software modules during the loop operation;
determining an average central processing unit (CPU)-to-graphics processing unit (GPU) copy speed of the client computer system; and
determining the predicted level of performance based on a combination of the base performance metric and the average CPU-to-GPU copy speed;
wherein the client status data structure is used to, for a request specifying a computing task to be performed and an identified software module to be applied to particular input data, by the one or more processors:
select a client computer system among the plurality of client computer systems to which to route the request; and
cause the selected client computer system to:
install the identified software module;
execute and apply the identified software module to the particular input data for processing the computing task;
process the computing task; and
provide a result of executing and applying the identified software module to the particular input data to a requestor computing system that provided the request.

24. One or more computer memories collectively having contents configured to cause a client software module executing by one or more processors on a client computer system to perform a method, the method comprising:
periodically reporting operating data for the client computer system, comprising:
first data reflecting a level of availability of the client computer system to perform external requests, based at least in part on a level at which a local user of the client computer system has recently used the client computer system,
second data reflecting, for each of a plurality of software modules, a level of availability of the software module on the client computer system, and
third data reflecting, for each of the plurality of software modules, a predicted level of performance of the client computer system in executing the software module, wherein the predicted level of performance is determined by:
obtaining a base performance metric for the client computer system by causing the client computer system to execute a loop operation using the software module during the loop operation;
determining an average central processing unit (CPU)-to-graphics processing unit (GPU) copy speed of the client computer system; and
determining the predicted level of performance based on a combination of the base performance metric and the average CPU-to-GPU copy speed;
receiving from a requestor computing system, a request specifying a computing task to be performed and delegated to the client computer system in response to selection of the client computer system from among a plurality of client computer systems in a local network, private network, or corporate network at least based on the operating data reported for the client computer system, the delegated request comprising:
information identifying a software module, and
input data upon which the identified software module is to be executed; and
in response to the request being delegated to the selected client system, causing the selected client computer system to:
install the identified software module;
execute and apply the identified software module upon the input data on the client computer system for processing the computing task to produce execution results;
process the computing task; and
respond to the requestor computing system with the execution results.

25. The one or more computer memories of claim 24 wherein the identified software module implements a machine learning model.

26. The one or more computer memories of claim 24 wherein the identified software module is executed at a first priority level below a second priority level used to execute software responsive to inputs from a local user of the client computer system.

27. The one or more computer memories of claim 26, the method further comprising:
receiving a second request delegated to the client computer system with respect to a second identified software module and second input data;
in response to receiving the second delegated request:
causing the second identified software module to be executed upon the second input data by the client computer system;
determining that, as the result of inputs from a local user of the client computer system, the second identified software module is being executed at a rate that is below a predetermined threshold;
in response to the determining:
ending execution of the second identified software module; and
sending an indication that the second delegated request should be redelegated to a different client computer system among the plurality.

28. The one or more computer memories of claim 27 wherein execution of the second identified software module produced intermediate results, the method further comprising:

sending at least a portion of the intermediate results along with the indication.

29. A secure computer network comprising:

a plurality of client nodes in a local network, private network, or corporate network, each assigned for use by at least one local user, each of the client nodes including one or more processors configured to perform a first method, the first method comprising:

periodically reporting operating data for the client node, comprising:

first data reflecting a level of availability of the client node to perform external requests, based at least in part on a level at which a local user of the client node has recently used the client computer system, second data reflecting, for each of a plurality of software modules, a level of availability of the software module on the client node, and third data reflecting, for each of the plurality of software modules, a predicted level of performance of the client node in executing the software module, wherein the predicted level of performance is determined by:

obtaining a base performance metric for the client node by causing the client node to execute a loop operation using the software module during the loop operation;

determining an average central processing unit (CPU)-to-graphics processing unit (GPU) copy speed of the client node; and determining the predicted level of performance based on a combination of the base performance metric and the average CPU-to-GPU copy speed;

a routing node including one or more processors configured to perform a second method, the second method comprising:

receiving operating data from each of the plurality of client nodes;

using the received operating data to update a client status resource that indicates, for each of the plurality of client nodes:

a level of availability of the client node to perform external requests, and a level of suitedness of the client node to perform external requests, wherein the level of suitedness is based on the level of availability of the software module and the predicted level of performance of the client node of the operating data reported from each of the plurality of client node;

receiving from one or more requestor nodes a series of requests, each request specifying a computing task to be performed and comprising:

information identifying a software module, and input data upon which the identified software module is to be executed;

in response to receiving each request:

accessing the client status resource;

using the accessed client status resource to select one of the plurality of client nodes;

causing the request to be delegated to the selected client node;

causing the selected client node to:

install the software module identified in the request;

execute the software module identified by the request upon the input data identified by the request;

the first method further comprising:

for each request delegated to the selected client node, causing the selected client node to:

install the software module identified in the request;

execute and apply the identified software module upon the input data on the client node for processing the computing task to produce execution results;

process the computing task; and respond to a requestor node of the one or more requestor nodes with the execution results.

30. The secure computer network of claim 29, further comprising:

a plurality of connectivity hub nodes each including one or more processors configured to perform a third method, wherein the routing node, in the second method, in response to receiving each request, causes the request to be delegated to the client node selected for the request by:

determining which of the plurality of connectivity hub nodes has been assigned to the client node selected for the request; and sending a relay direction to the determined connectivity hub node, the relay direction comprising:

the request, and information identifying the client node selected for the request;

the third method comprising:

receiving one or more relay directions from the routing node; and for each received relay direction, forwarding the request to the client node identified by the information in the relay direction.

* * * * *